UNITED STATES PATENT OFFICE.

FRIEDRICH WILHELM SAMUEL VALENTINER, OF LEIPSIC, GERMANY.

SALICYLIC-ACID METHYLENE ACETATE AND PROCESS OF MAKING SAME.

No. 811,884.    Specification of Letters Patent.    Patented Feb. 6, 1906.

Application filed May 12, 1905. Serial No. 260,123. (Specimens.)

*To all whom it may concern:*

Be it known that I, FRIEDRICH WILHELM SAMUEL VALENTINER, a subject of the German Emperor, and a resident of Leipsic, Germany, have invented a new and useful Improvement in Salicylic-Acid Methylene Acetate and Process of Making the Same, of which the following is a specification.

Acetyl salicylic acid having a melting-point of 135° centigrade, free from salicylic acid and acetic acid, is mixed with half its weight (one molecule) of formaldehyde solution of forty-per-cent. strength and heated in a flask in a sand-bath until the whole is dissolved. The flask is then emptied into a porcelain basin, the crystal cakes formed on cooling are comminuted, and the entire mass recrystallized from water. The new body so obtained is soluble with difficulty in cold water, readily soluble in warm water and in alcohol, but somewhat less soluble in ether. It crystallizes in small needles and has a feeble but characteristic smell of the salicylic-acid esters and melts at 108° centigrade. Elementary analysis gave the following values: 0.1610 grams of the substance yielded 0.0725 grams $H_2O$ and 0.3375 grams $CO_2$:

| Found. | Calculated from the formula $C_{10}H_{10}O_5$. |
|---|---|
| H. 5.00 per cent. | 4.76 per cent. |
| C. 57.02 per cent. | 57.14 per cent. |

The new body has thus the formula $C_{10}H_{10}O_5$, and the reaction must be according to the following equation:

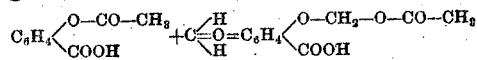

It is known that acid anhydrids react with aldehydes in the above manner; but it was not heretofore known and could not be foreseen that acetyl salicylic acid—the acetic ester of salicylic acid—acts in like manner on aldehyde.

It appears that the new body as glycol ester shows the salicylic reaction with ferric chlorid, because the alcoholic OH group of salicylic acid is therein replaced by the glycol-like methylene acetate. Acetyl salicylic acid, on the other hand, with its acid ester group, gives no coloration with iron.

If to a trace of the salicylic-acid methylene acetate be added one-half cubic centimeter of 0.1-per-cent.-phloroglucin solution and then some drops of potash lye, there is produced a slight-brown coloration. When the same has been allowed to stand some days, the coloration becomes very distinct. This appears to be due to the fact that the saponification of the above compound takes place very slowly. If the acetate be boiled some time with ammoniacal silver-nitrate solution, the aldehyde silver mirror is formed in the glass. Acetyl salicylic acid treated in the same way gives no silver mirror.

The new composition of matter is therefore an organic chemical product formed by reacting on one molecule of acetyl salicylic acid with one molecule of formaldehyde and is designed, by reason of its valuable therapeutical properties, to be used as an internal medicine for dissolving the sediments of uric acid. It is administered in doses of five to twenty grains, according to the constitution of the patient suffering from gout or rheumatism.

The new product is distinguished from similar compounds obtained by the reaction of formaldehyde one molecule on two molecules of salicylic acid and having the melting-point of 245° centigrade, (United States Patent No. 706,354, methylene disalicylic acid,) which intermediate product if afterward acetylated has a melting-point of 145° centigrade, (United States Patent No. 770,178, methylene di-aceto di-salicyl acid.) Both last-named products are perfectly insoluble in water and contain less formaldehyde than my product.

What I claim, and desire to secure by Letters Patent of the United States, is—

1. The herein-described method of producing salicylic-acid methylene acetate consisting in reacting on acetyl salicylic acid with formaldehyde.

2. The new composition of matter having the formula $C_{10}H_{10}O_5$ constituting salicylic-acid methylene acetate, soluble in water and melting at 108°, as described.

In testimony whereof I have signed my name to this specification in the presence of two subscribing witnesses.

FRIEDRICH WILHELM SAMUEL VALENTINER.

Witnesses:
 RUDOLPH FRICKE,
 SOUTHARD P. WARNER.